United States Patent
Tuchman

(10) Patent No.: US 9,125,463 B2
(45) Date of Patent: Sep. 8, 2015

(54) TOW STRAP BAG

(71) Applicant: ZIP IT LTD., Tel Aviv (IL)

(72) Inventor: Shon Tuchman, Tel Aviv (IL)

(73) Assignee: ZIP IT LTD., Tel Aviv (IL)

( * ) Notice: Subject to any disclaimer, the term of this patent is extended or adjusted under 35 U.S.C. 154(b) by 0 days.

(21) Appl. No.: 14/181,674

(22) Filed: Feb. 16, 2014

(65) Prior Publication Data

US 2014/0161370 A1 Jun. 12, 2014

Related U.S. Application Data

(63) Continuation-in-part of application No. 12/564,110, filed on Sep. 22, 2009, now abandoned.

(51) Int. Cl.
*A45C 9/00* (2006.01)
*B60D 1/18* (2006.01)
*A45C 7/00* (2006.01)

(52) U.S. Cl.
CPC ... *A45C 9/00* (2013.01); *B60D 1/18* (2013.01); *A45C 2007/0009* (2013.01); *Y10T 29/49716* (2015.01)

(58) Field of Classification Search
CPC .............. A45C 2007/0009; A45C 2007/0013; B60D 1/18
USPC ...................... 224/197; 190/1, 15.1, 903, 103; 150/127; 383/4, 97; 280/480, 480.1
See application file for complete search history.

(56) References Cited

U.S. PATENT DOCUMENTS

| | | | |
|---|---|---|---|
| 1,483,253 A | 2/1924 | Tabler | |
| 1,803,389 A | 5/1931 | Herlbauer | |
| 3,073,367 A | 1/1963 | Samara | |
| 4,200,132 A | 4/1980 | Avery | |
| 4,239,271 A * | 12/1980 | Beasley et al. | 294/74 |
| 4,378,866 A | 4/1983 | Pelavin | |
| 4,710,983 A | 12/1987 | Markoff | |
| 4,869,408 A | 9/1989 | Lutz | |
| 4,923,105 A | 5/1990 | Snyder | |
| 6,647,555 B2 * | 11/2003 | Yamaguchi et al. | 2/338 |
| 7,509,985 B2 * | 3/2009 | Metsch | 150/127 |
| 2008/0121554 A1 | 5/2008 | Townsend | |

* cited by examiner

*Primary Examiner* — Brian D Nash
*Assistant Examiner* — Corey Skurdal
(74) *Attorney, Agent, or Firm* — Soker-Agmon

(57) ABSTRACT

A tow strap bag, including, an elongated tow strap with a top end and a bottom end for towing objects, two half zippers each having an elongated row of teeth coupled to the tow strap in parallel on a single side along the elongated axis of the tow strap with the teeth of each half zipper located near an edge of the width of the single side of the tow strap and facing opposite edges; wherein the two half zippers are coupled to the entire tow strap length except leaving the top end and the bottom end of the tow strap without the half zippers coupled thereon; and wherein the tow strap is configured to form a bag when zipping up the two half zippers.

20 Claims, 11 Drawing Sheets

TOW STRAP BAG

RELATED APPLICATIONS

This application claims priority as a continuation in part under 35 U.S.C. 120 from application Ser. No. 12/564,110 filed on Sep. 22, 2009 the disclosure of which is incorporated herein by reference.

FIELD OF THE DISCLOSURE

The present disclosure relates generally to a tow strap that converts into a bag and more specifically to a tow strap with a zipper attached to it for zipping it up to form the bag.

BACKGROUND OF THE DISCLOSURE

Tow straps are used in many applications, for example to pull a vehicle out of a ditch or to get the vehicle to start, to lift a weight up onto a platform or lower a weight down to a lower level.

In many cases the tow strap is used by a vehicle owner only in limited circumstances and most of the time it just collects dust or gets tangled up with other items stored by the owner. As a result sometimes when the tow strap is needed the owner cannot recollect where it was placed.

In some cases the vehicle owner equips the vehicle with numerous items that are designated to be used in emergency, for example a tow strap, a hazard warning triangle, jumper cables, a flashlight, a jack and various other tools. The vehicle owner may use a container to keep the items together and prevent them from mixing with other items, so that they will be readily available in case of need.

SUMMARY OF THE DISCLOSURE

An aspect of an embodiment of the disclosure, relates to an elongated tow strap with two elongated half zippers coupled along the elongated axis of the tow strap on a single side of the tow strap. The two half zippers are positioned so that the teeth of the half zippers face the edges of the width of the tow strap and are positioned near the edge. The teeth of one half zippers face an upper edge and the teeth of the other half zipper face a lower edge. The half zippers are positioned to cover the entire length of the tow strap except leaving an uncovered area at each end to form a free top end and a free bottom end for use in connecting the tow strap to objects to be towed without damaging the zipper. In an exemplary embodiment of the disclosure, a bottom flap is positioned near the bottom end of the tow strap and attached to the two half zippers with one of the half zippers surrounding the circumference of the bottom flap and forming a connection with the other half zipper, wherein the connection serves as the beginning of the zipper to zip up the tow strap.

In an exemplary embodiment of the disclosure, when zipping up the zipper the tow strap forms a bag with the bottom flap serving as the bottom of the bag and the tow strap winding around shaped as a helix to form the body of the bag. Optionally, the side without the half zippers attached, referred to as a clean side, serves as the exterior side of the bag. Optionally, when the tow strap serves as a tow strap the clean side is positioned to rub against the ground, rocks, a pulley or other objects without damaging the half zippers on the other side.

In an exemplary embodiment of the disclosure, the top end and/or the bottom end are folded over and sewn or otherwise attached to form a loop for grasping tow hooks or other items. Optionally, the ends may be folded and half twisted to form a half twisted loop to increase the rigidity of the loop. In an exemplary embodiment of the disclosure, a top flap is attached to one of the half zippers near the top end to serve as a top for the bag. Optionally, when zipping up the bag the bottom flap is attached to the tow strap with the zippers first and the top flap is attached last.

There is thus provided according to an exemplary embodiment of the disclosure, a tow strap bag, comprising:
  an elongated tow strap with a top end and a bottom end for towing objects;
  two half zippers each having an elongated row of teeth coupled to the tow strap in parallel on a single side along the elongated axis of the tow strap with the teeth of each half zipper located near an edge of the width of the single side of the tow strap and facing opposite edges; wherein the two half zippers are coupled to the entire tow strap except leaving the top end and the bottom end of the tow strap without the half zippers coupled thereon; and
  wherein the tow strap is configured to form a bag when zipping up the two half zippers.

In an exemplary embodiment of the disclosure, the tow strap bag includes a bottom flap to serve as a bottom of the tow strap bag; the bottom flap is attached to both half zippers near the bottom end of the tow strap. Optionally,
  one of the half zippers extends around the circumference of the bottom flap. In an exemplary embodiment of the disclosure, the tow strap bag is configured so that when zipping up the tow strap bag the bottom flap is attached by the zipper to the elongated tow strap before attaching different areas of the elongated tow strap to each other.

In an exemplary embodiment of the disclosure, the tow strap bag includes a top flap to serve as a top of the tow strap bag; the top flap is attached to one of the half zippers next to the top of the tow strap. Optionally, the half zipper attached to the top flap surrounds the circumference of the top flap. In an exemplary embodiment of the disclosure, the tow strap bag is configured so that when zipping up the tow strap bag the top flap is the last to be attached.

In an exemplary embodiment of the disclosure, when zipping up the tow strap bag the side without the half zippers attached serves as an exterior side of the tow strap bag. Optionally, the top end of the tow strap is folded over and attached to itself forming a loop. Alternatively, the top end is folded over with a half twist and attached to itself forming a twisted loop.

In an exemplary embodiment of the disclosure, the bottom end is folded over and attached to itself forming a loop. Alternatively, the bottom end is folded over with a half twist and attached to itself forming a twisted loop.

There is further provided according to an exemplary embodiment of the disclosure, a method of converting an elongated tow strap with a top end and a bottom end for towing objects into a tow strap bag, comprising:
  coupling two half zippers each having an elongated row of teeth on a single side in parallel along the elongated axis of the tow strap with the teeth of each half zipper located near an edge of the width of the single side of the tow strap and facing opposite edges; wherein the two half zippers are coupled to the entire tow strap except leaving the top end and the bottom end of the tow strap without the half zippers coupled thereon; and
  wherein the tow strap is configured to form a bag when zipping up the two half zippers.

Optionally, the method includes attaching a bottom flap to serve as a bottom of the tow strap bag, wherein the bottom flap is attached to both half zippers near the bottom end of the tow strap. In an exemplary embodiment of the disclosure, one of the half zippers extends around the circumference of the bottom flap. Optionally, the tow strap bag is configured so that when zipping up the tow strap bag the bottom flap is attached by the zipper to the elongated tow strap before attaching different areas of the elongated tow strap to each other.

In an exemplary embodiment of the disclosure, the method includes attaching a top flap to serve as a top of the tow strap bag, wherein the top flap is attached to one of the half zippers next to the top of the tow strap. Optionally, the half zipper attached to the top flap surrounds the circumference of the top flap. In an exemplary embodiment of the disclosure, the tow strap bag is configured so that when zipping up the tow strap bag the top flap is the last to be attached.

BRIEF DESCRIPTION OF THE DRAWINGS

The present disclosure will be understood and better appreciated from the following detailed description taken in conjunction with the drawings. Identical structures, elements or parts, which appear in more than one figure, are generally labeled with the same or similar number in all the figures in which they appear, wherein.

DETAILED DESCRIPTION

Figure 1:
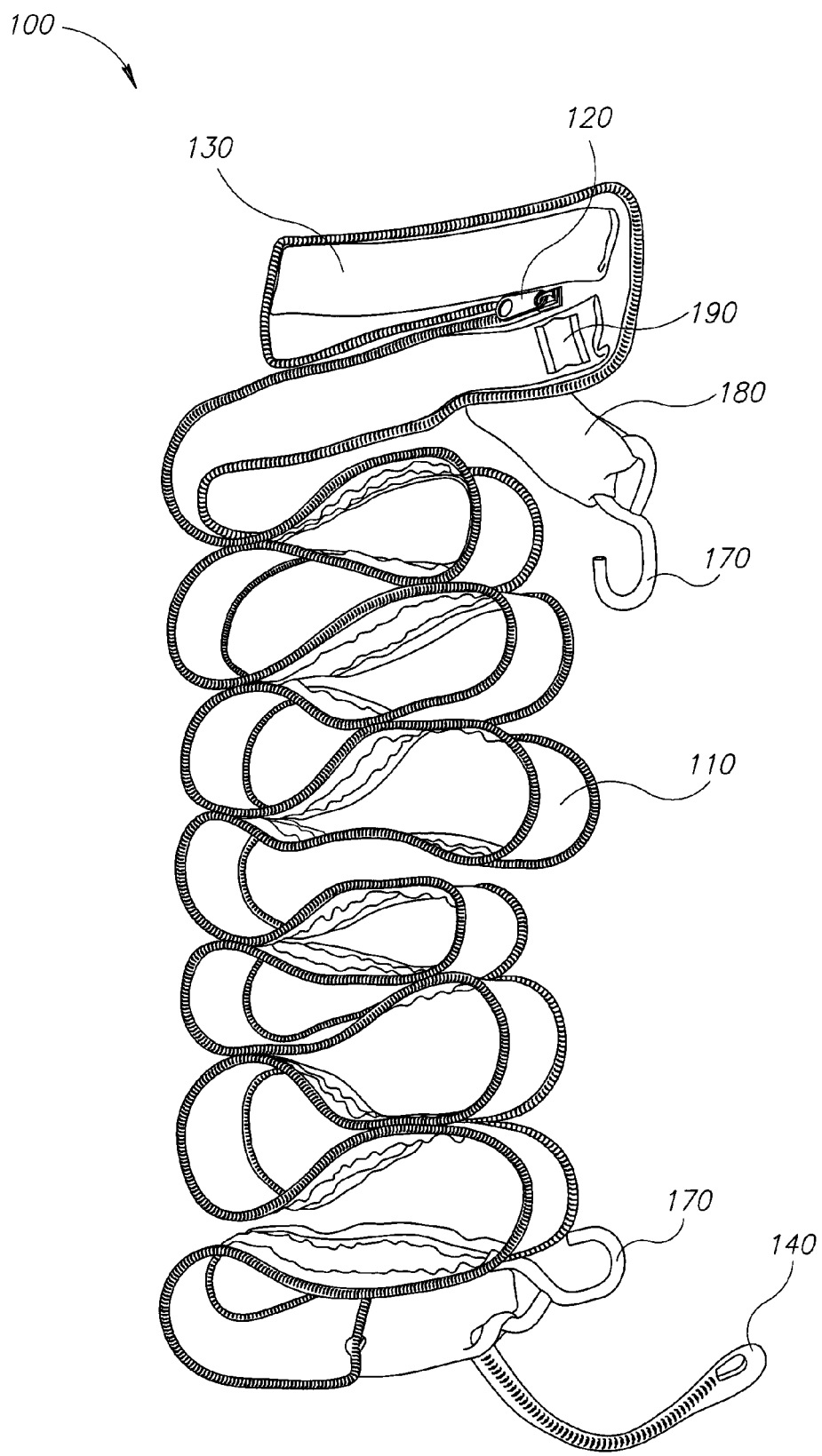
FIG. 1 is a schematic illustration of an unzipped tow strap bag, according to an exemplary embodiment of the disclosure.
Figure 2:
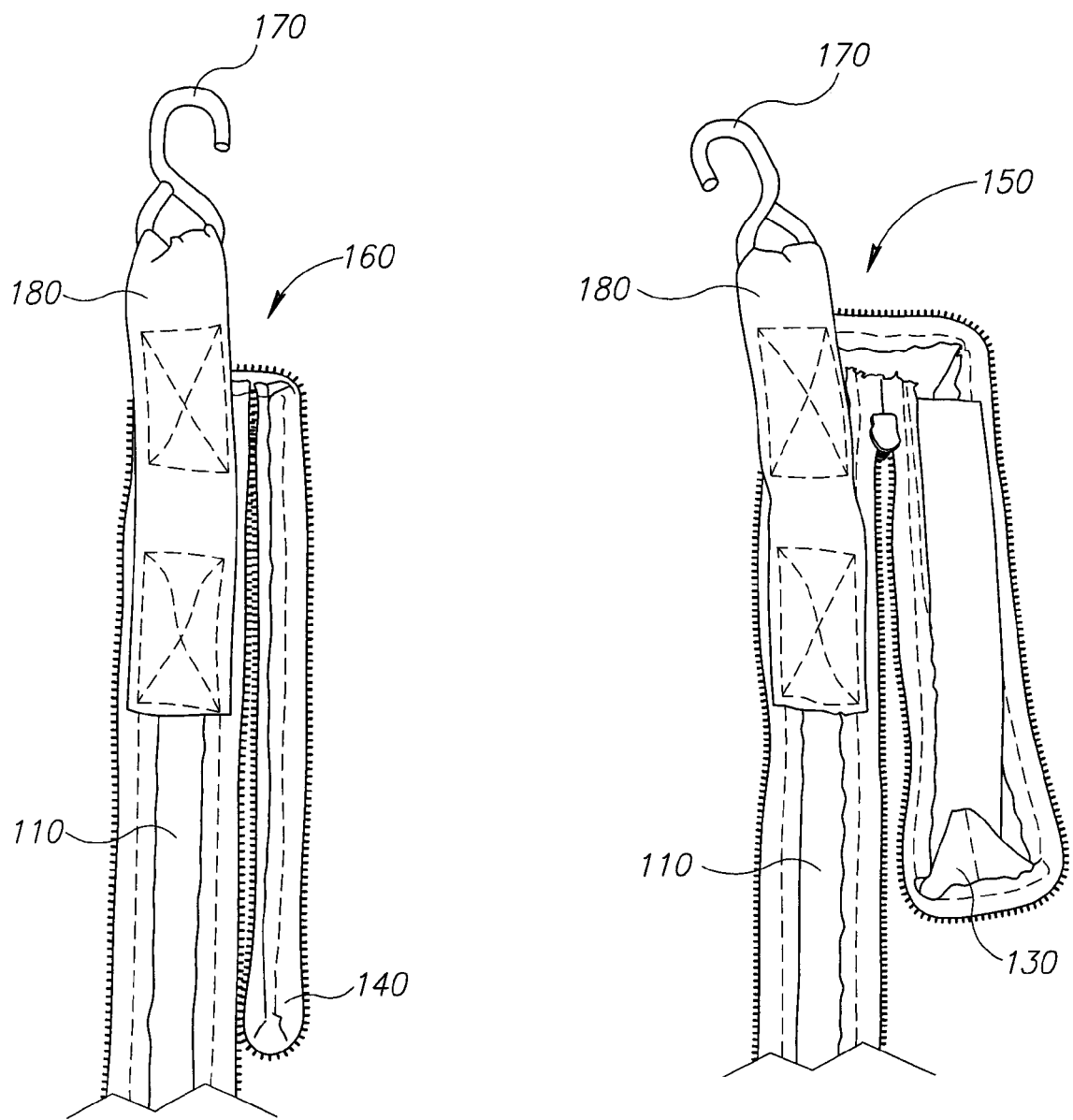
FIG. 2 is a schematic illustration of the ends of a tow strap bag, according to an exemplary embodiment of the disclosure.

FIG. 1 is a schematic illustration of an unzipped tow strap bag 100, and FIG. 2 is a schematic illustration of the ends of tow strap bag 100, according to an exemplary embodiment of the disclosure. Optionally, tow strap bag 100 is made up from a tow strap 110 with an open zipper 120 surrounding the entire circumference of tow strap 110, so that a bag can be formed by zipping up zipper 120. In an exemplary embodiment of the disclosure, an extra flap 130 is attached to tow strap 110 on one end to serve as a bottom 150 for tow strap bag 100. Optionally, extra flap 130 is formed by folding over the end of tow strap 110 and sewing it to form a U shaped end. Alternatively, an additional piece of material may be used to form extra flap 130. Optionally, the extra material may be the same as used for tow strap 100 or a different type of material may be used, for example tow strap 110 may be made up from canvas, nylon, plastic, woven metal or any other material that can provide enough strength to serve as a tow strap. Optionally, extra flap 130 may be the same material or it may be harder or softer than the rest of the bag to form bottom 150 with a desired rigidity, since bottom 150 does not serve as part of tow strap 110. Optionally, zipper 120 begins at the bottom of the U shaped end between tow strap 110 and extra flap 130. Optionally, a pull tab 126 is located there to pull a slider 123 that connects between the part of the zipper attached to the extra flap and the part of the zipper that is attached to tow strap 110.

In an exemplary embodiment of the disclosure, zipper 120 ends at the top with an extra zipper extension 140 to form a sealed top 160. Alternatively or additionally, top 160 may or may not include extra zipper extension 140 thus forming a sealable or non-sealable top.

In an exemplary embodiment of the disclosure, a fastening element 170 (e.g. a hook, a claw, a loop) is attached to both ends of tow strap 110. In some embodiments of the disclosure, a different type or different shaped fastening element 170 is attached to each end of tow strap 110, or one end may not include fastening element 170. Optionally, fastening element 170 is attached directly to tow strap 110, for example to a loop 190 provided for accommodating a fastening element near the end of tow strap 110. Alternatively, fastening element 170 may be attached to an extra strap 180 that is coupled to tow strap 110, for example by sewing them together. Optionally, extra strap 180 is reinforced or specially designed to support fastening element 170. Optionally, the use of extra strap 180 prevents fastening element 170 from interfering with zipper 120 to form tow strap bag 100 from tow strap 110.

Figure 3:
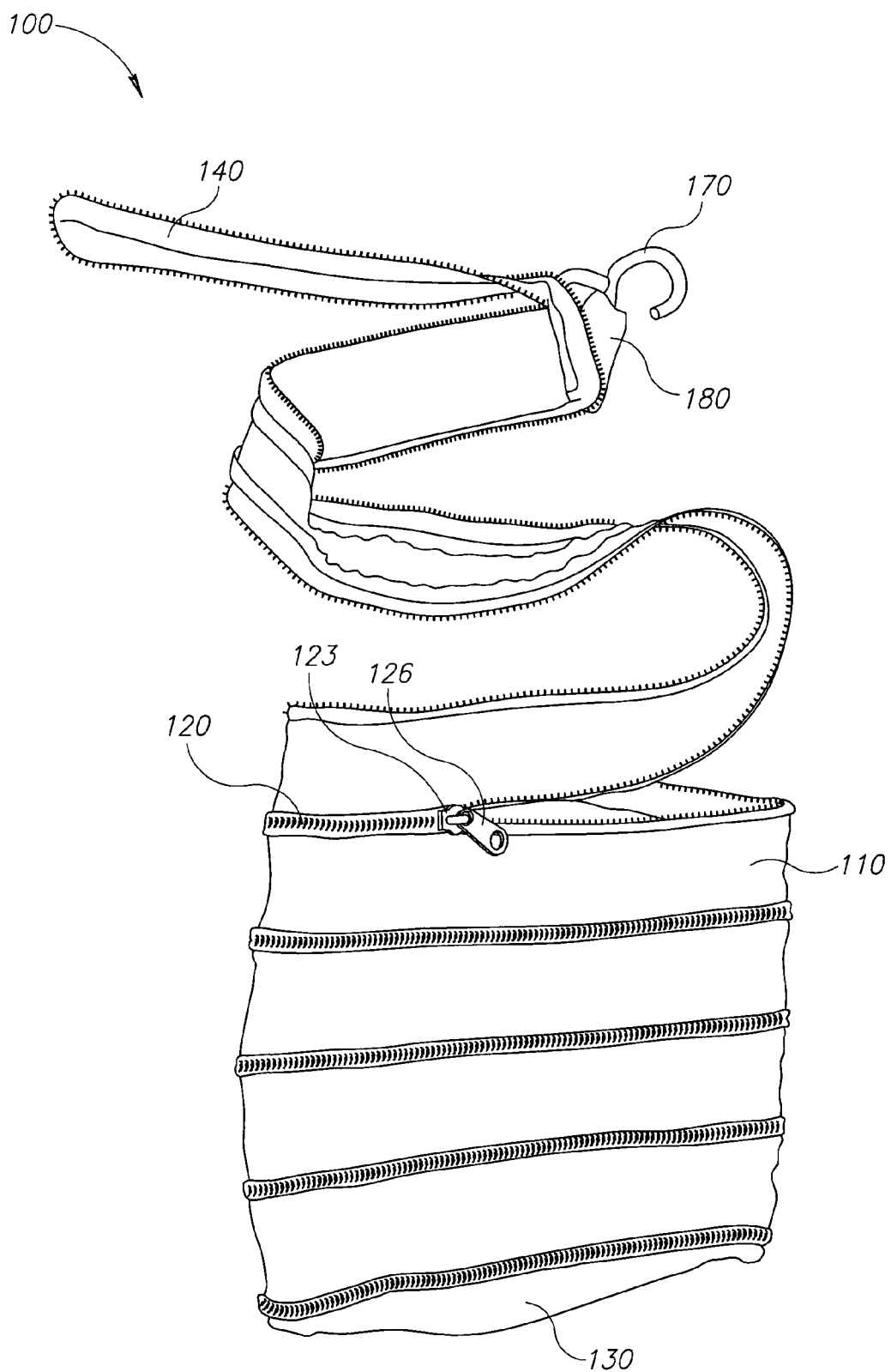
FIG. 3 is a schematic illustration of a partially zipped tow strap bag, according to an exemplary embodiment of the disclosure.

FIG. 3 is a schematic illustration of a partially zipped tow strap bag 100, according to an exemplary embodiment of the disclosure. In an exemplary embodiment of the disclosure, the user grasps pull tab 126 of zipper 120 and pulls slider 123 to cause zipper 120 to connect between two extensions of tow strap 110. As the zipper advances, tow strap 110 wraps around extra flap 130 and forms tow strap bag 100 with extra flap 130 serving as the bottom of tow strap bag 100. In some embodiments of the disclosure, extra flap 130 is shaped as a rectangle thus forming a rectangular shaped bag. Alternatively, extra flap 130 may be shaped as an ellipse or circle giving the bag an ellipse or circular shape. Optionally, at the top extra zipper extension 140 is positioned to seal tow strap bag 100, when tow strap 110 reaches its end.

Figure 4:
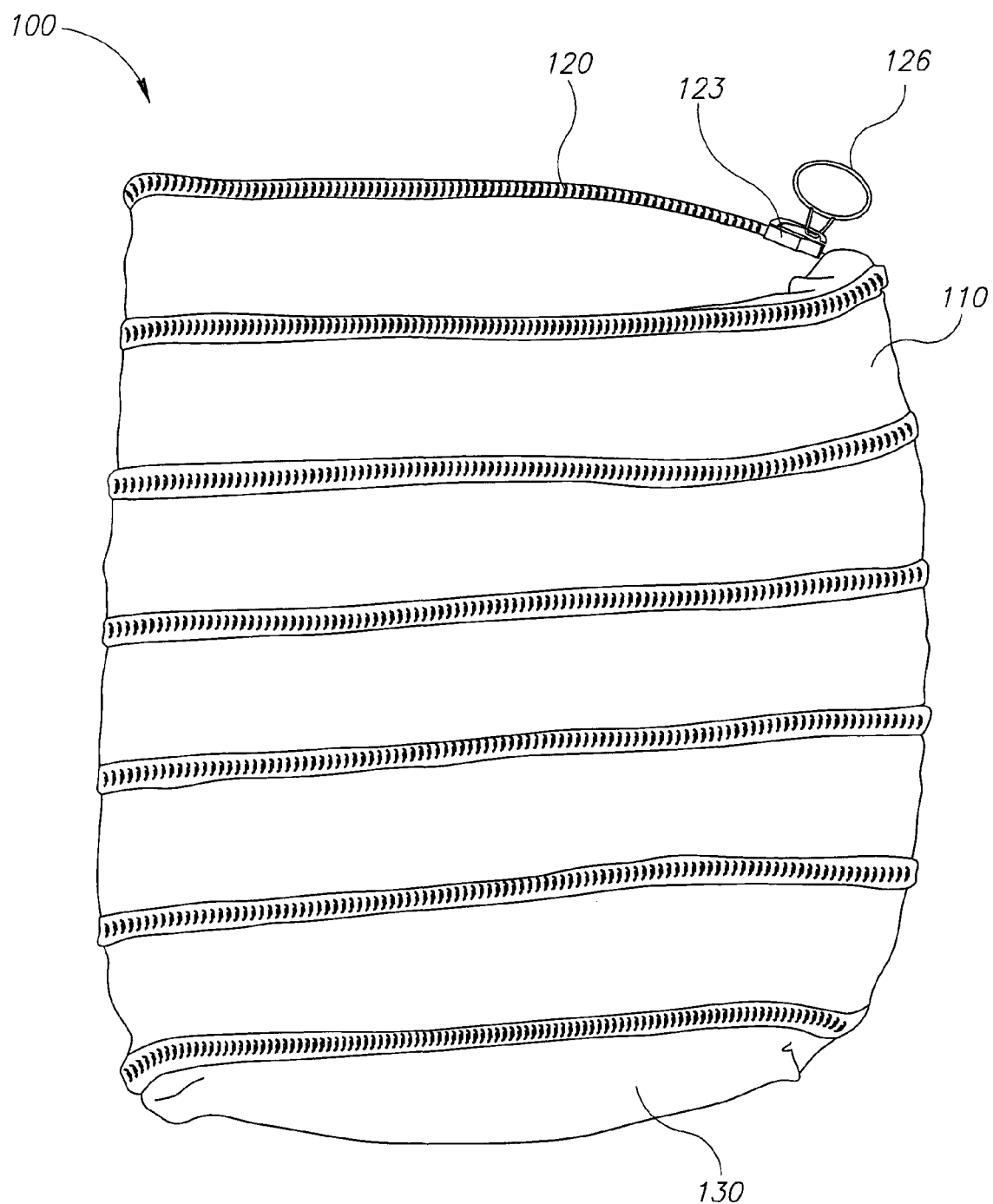
FIG. 4 is a schematic illustration of a zipped up tow strap bag, according to an exemplary embodiment of the disclosure.

FIG. 4 is a schematic illustration of a zipped up tow strap bag 100, according to an exemplary embodiment of the disclosure. Optionally, tow strap bag 100 may be used as a general purpose bag to hold items for the user. In an exemplary embodiment of the disclosure, tow strap 110 may be provided in various sizes. Optionally, the size is determined based on the size of the tow strap 110 required, and taking into consideration the desired size for the resulting bag.

In some embodiments of the disclosure, tow strap 110 is color coded to let the user know at a glance what strength the tow strap may be used for, for example a yellow tow strap 110 may indicate that tow strap 110 may be used to tow anything up to a mass of 500 Kg, and a red tow strap 110 may indicate that tow strap 110 may be used for a mass greater than 500 Kg, for example between 500-1000 Kg. Optionally, also zipper 120 may be color coded, for example to indicate the volume of the bag. In some embodiments of the disclosure, pull tab 126 includes a functional apparatus, for example a flashlight, a corkscrew or a compass.

Figure 5A:
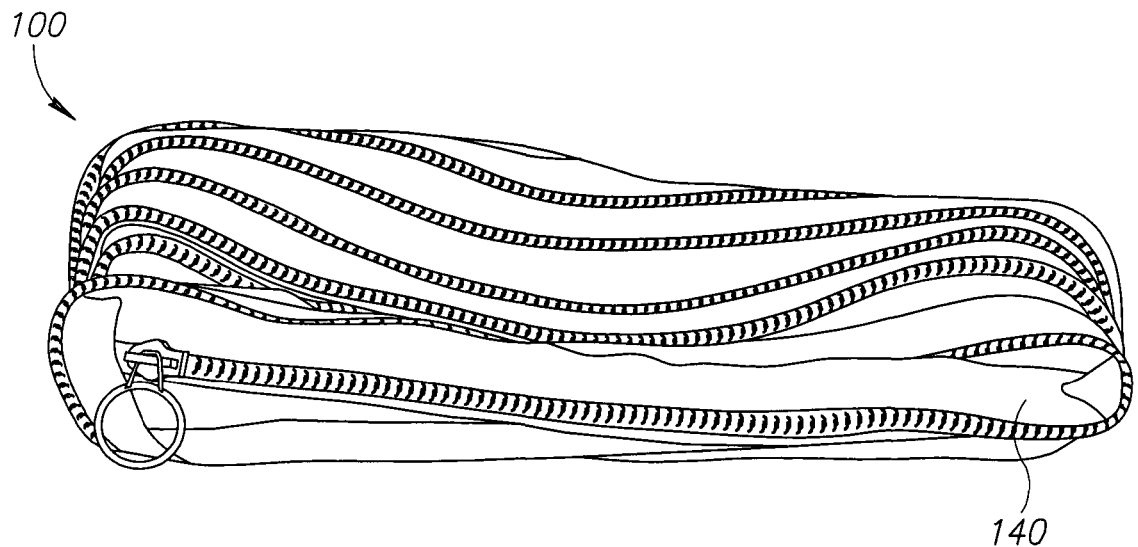
FIG. 5A is a schematic illustration of a top view of a zipped up tow strap bag, according to an exemplary embodiment of the disclosure.
Figure 5B:
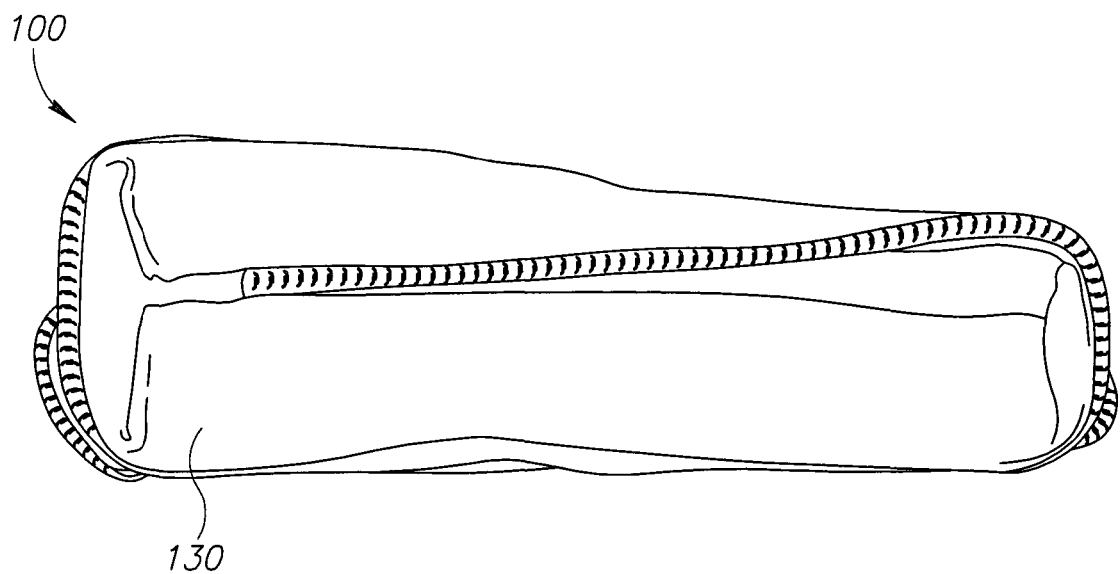
FIG. 5B is a schematic illustration of a bottom view of a zipped up tow strap bag, according to an exemplary embodiment of the disclosure.

FIG. 5A is a schematic illustration of a top view of a zipped up tow strap bag 100, and FIG. 5B is a schematic illustration of a bottom view of a zipped up tow strap bag 100, according to an exemplary embodiment of the disclosure;

Optionally, tow strap bag 100 may be used to enclose a kit of emergency items so that it serves a dual purpose:

a. As the container to hold the items; and
b. As a tow strap 110 that is part of the emergency items.

Figure 6:
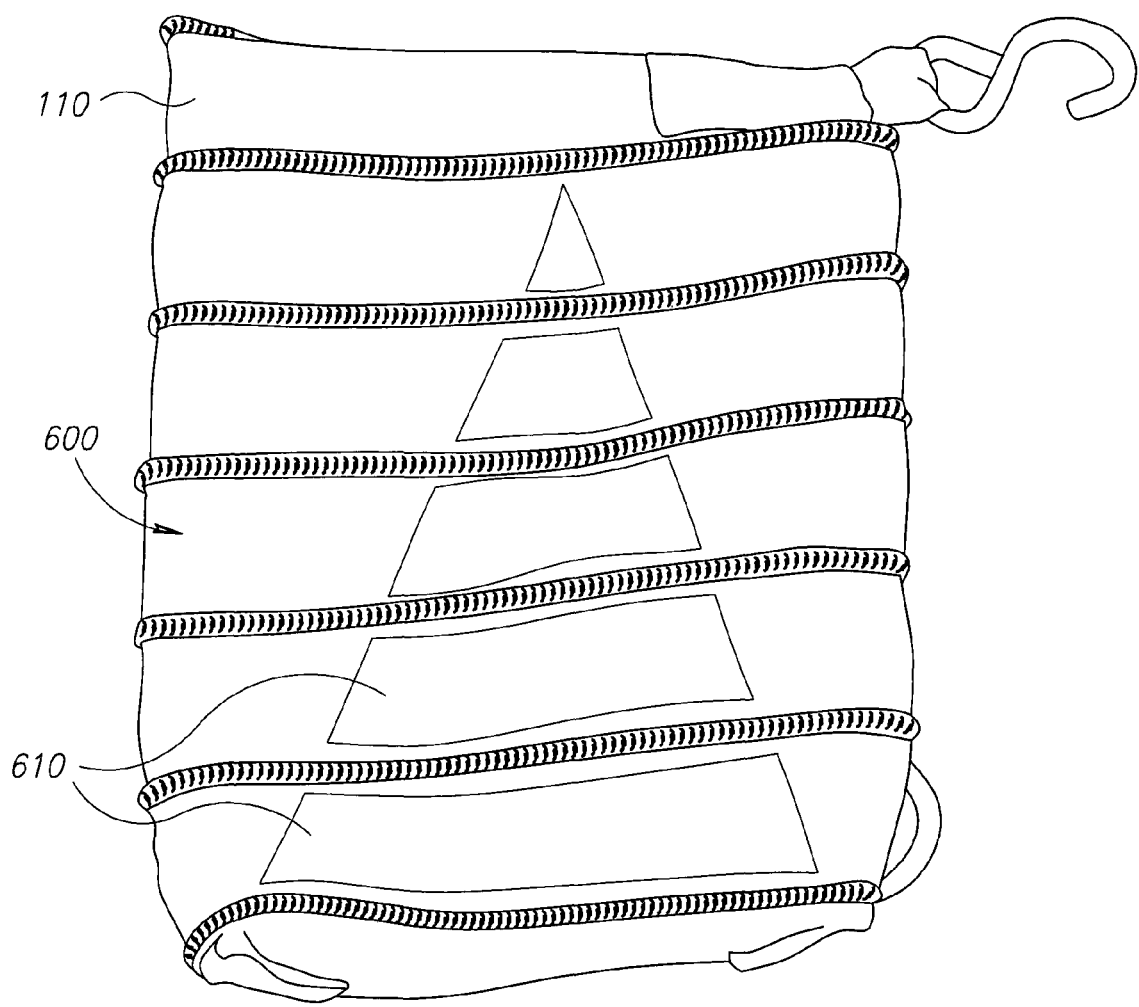
FIG. 6 is a schematic illustration of a tow strap bag that forms a hazard warning triangle, according to an exemplary embodiment of the disclosure.

FIG. 6 is a schematic illustration of a tow strap bag 110 that forms a hazard warning triangle 600, according to an exemplary embodiment of the disclosure. In an exemplary embodiment of the disclosure, the kit may include tow strap 110, hazard warning triangle 600, jumper cables, a flashlight, a jack and various other tools. Optionally, when tow strap bag 110 is unzipped it can serve as tow strap 110. When it is zipped up it can serve as hazard warning triangle 600 and/or as tow strap bag 100.

In an exemplary embodiment of the disclosure, hazard warning triangle 600 is made up by placing reflective strips 610 on tow strap 110 so that when tow strap 110 is zipped up to form tow strap bag 100 a reflective triangle is formed. Optionally, the reflective strips may be adhesively attached to tow strap bag 100 or sewed on. Alternatively, the reflective strips are printed onto tow strap 110. The reflective triangle can be placed on the road or inside a vehicle to serve as a hazard warning triangle 600.

In some embodiments of the disclosure, hazard warning triangle 600 forms an essentially solid triangle as shown in FIG. 6. Alternatively, hazard warning triangle 600 may form an outline of a triangle. In some embodiments of the disclosure, other reflective shapes may be formed to provide other functions.

Figure 7:
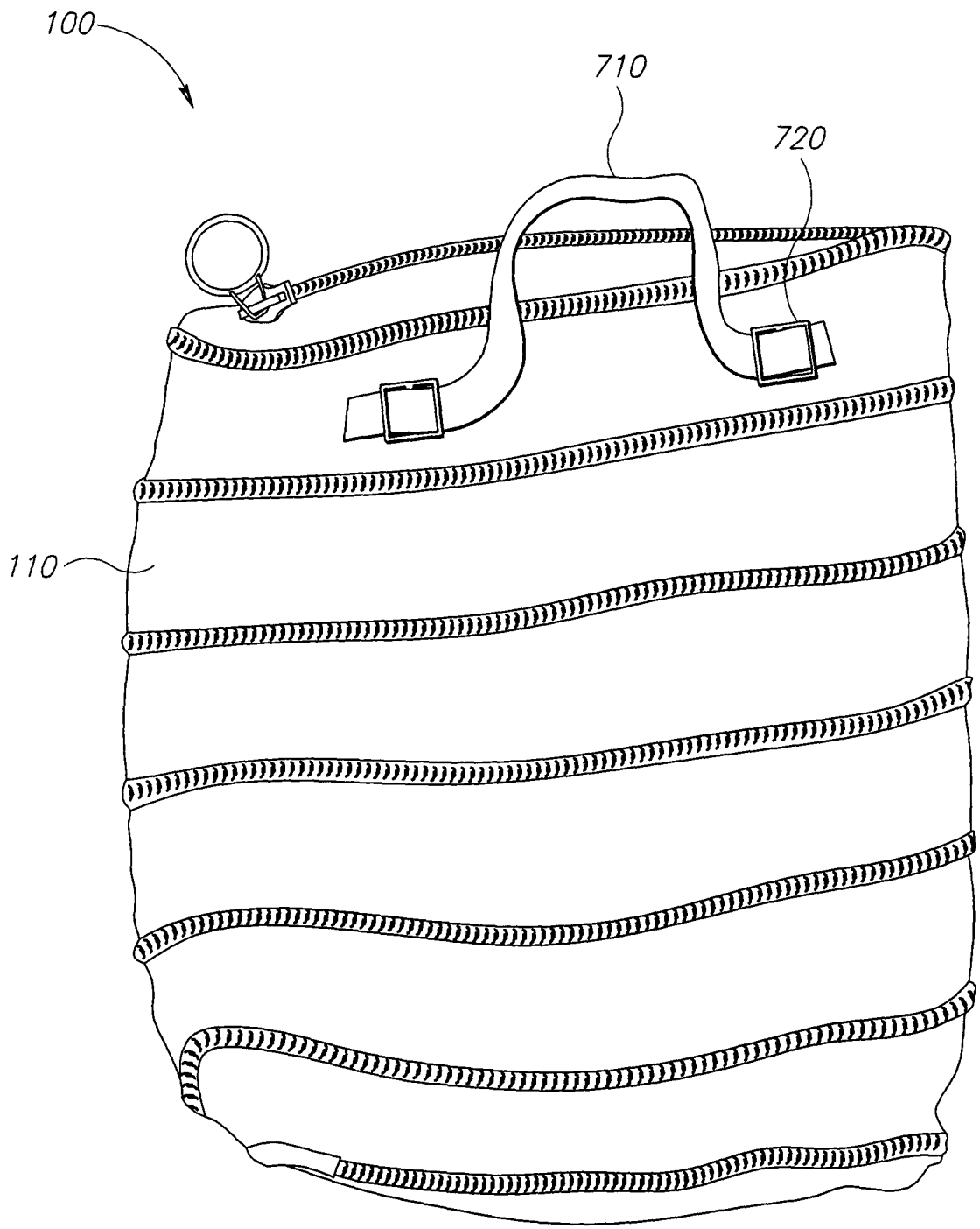
FIG. 7 is a schematic illustration of a tow strap bag with carrying straps, according to an exemplary embodiment of the disclosure.

FIG. 7 is a schematic illustration of a tow strap bag 100 with carrying straps 710, according to an exemplary embodiment of the disclosure. In an exemplary embodiment of the disclosure, carrying straps 710 are attached to predetermined positions on tow strap 110, so that tow strap bag 100 will have carrying straps 710 when it is zipped up to form a bag. In some embodiments of the disclosure, carrying straps 710 may be short and serve as handles for holding the bag. Alternatively, they may be long so that the bag can be worn over a persons shoulder.

Figure 8:
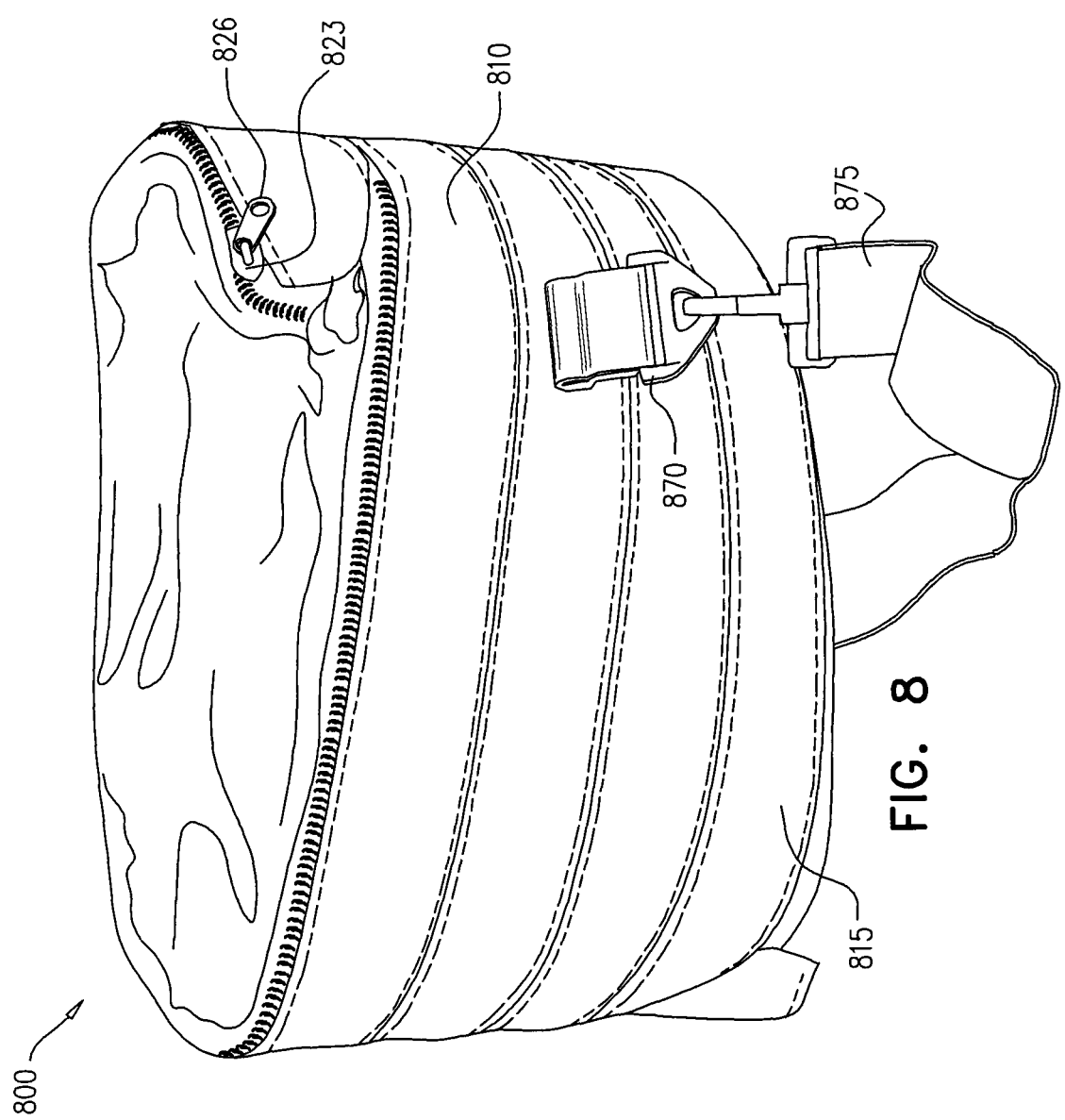
FIG. 8 is a schematic illustration of an alternative tow strap bag, according to an exemplary embodiment of the disclosure.
Figure 9:
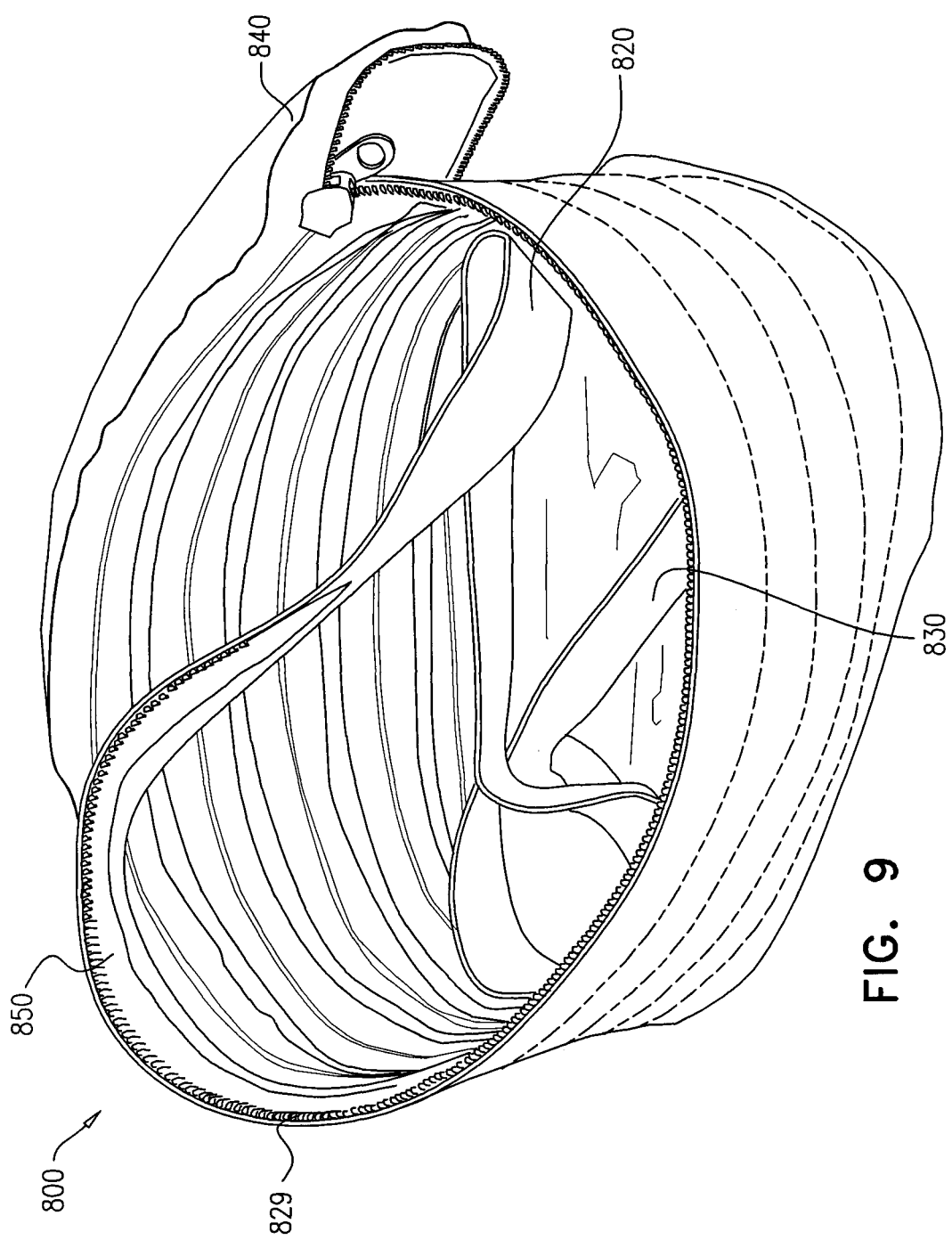
FIG. 9 is a schematic illustration of the inside an alternative tow strap bag, according to an exemplary embodiment of the disclosure.
Figure 10:
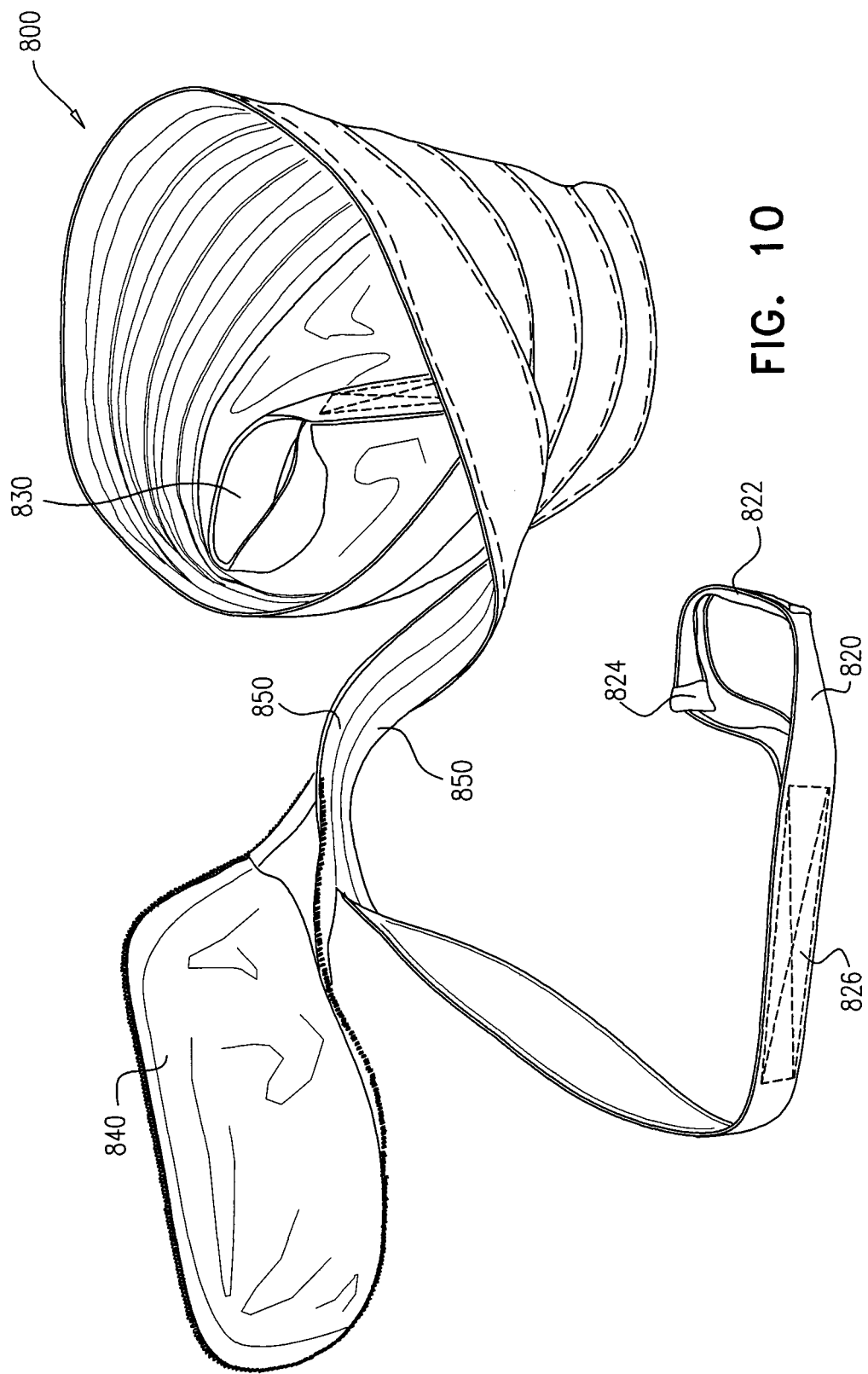
FIG. 10 is a schematic illustration of an alternative tow strap bag partially unzipped, according to an exemplary embodiment of the disclosure.
Figure 11:
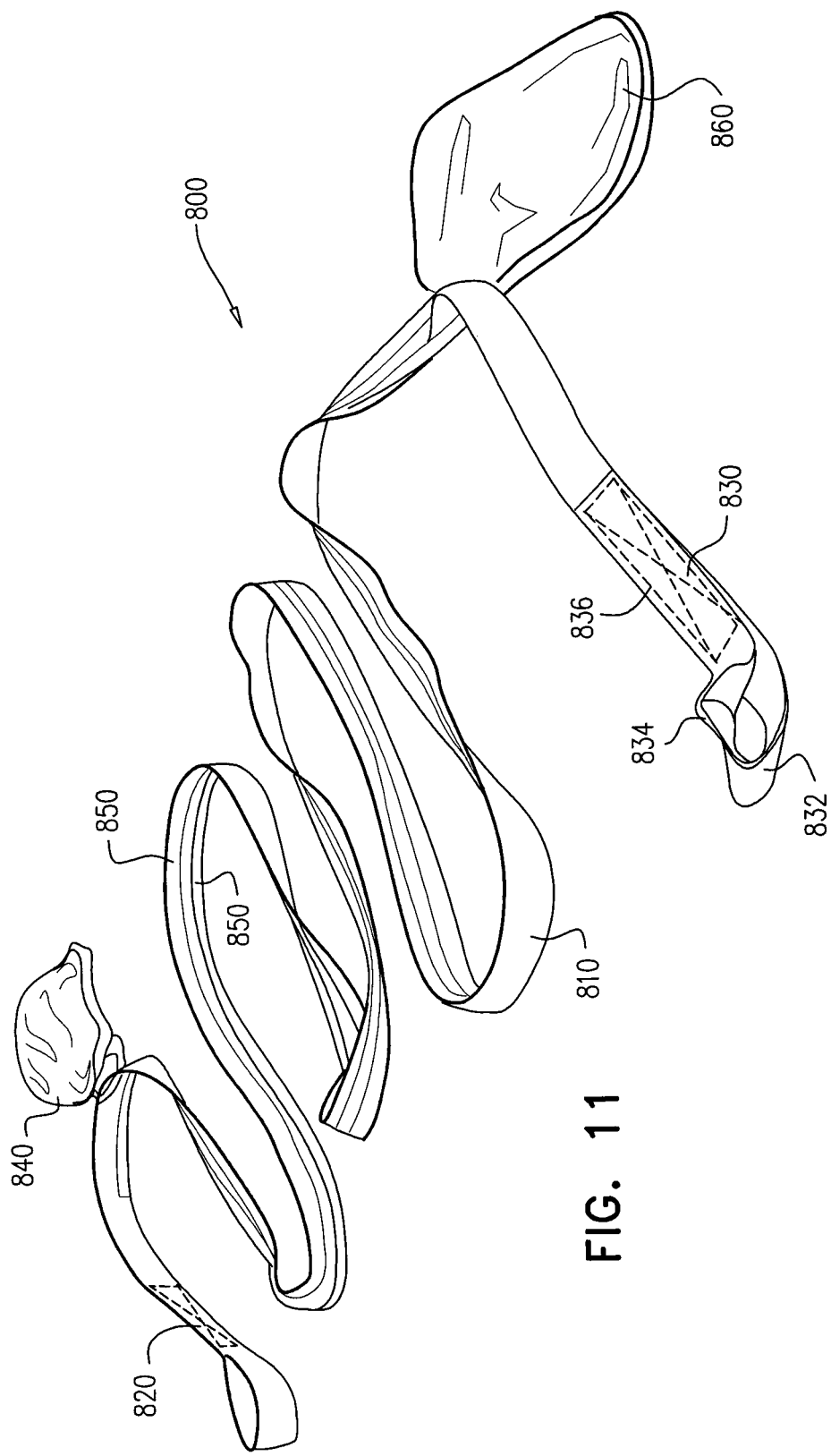
FIG. 11 is a schematic illustration of an alternative tow strap completely unzipped, according to an exemplary embodiment of the disclosure.

In some embodiments of the disclosure, carrying straps 710 are attached with a non permanent attachment (e.g. a buckle 720) so that the carrying straps may be removed when not needed, for example when using tow strap 110 to pull something instead of using it to form a bag. Additionally, the size of the carrying straps 710 may be adjusted FIGS. 8 to 11 are schematic illustration of an alternative tow strap bag 800, according to an exemplary embodiment of the disclosure. FIG. 8 shows bag 800 in zipped up form. FIG. 9 shows bag 800 with the top removed revealing the inside of bag 800. FIG. 10 shows bag 800 when it is partially unzipped and FIG. 11 shows bag 800 when it is entirely unzipped.

In an exemplary embodiment of the disclosure, tow strap bag 800 includes an elongated tow strap 810 that can be used for example to tow a car, a wagon or other objects. In an exemplary embodiment of the disclosure, the tow strap comprises two zipper halves 850 each having an elongated row of zipper teeth 829 and the two zipper halves are coupled in parallel to each other to tow strap 810, for example sewn or adhesively attached along the elongated axis of the tow strap 810. In an exemplary embodiment of the disclosure one half zipper 850 faces toward one edge of the width of tow strap 810 and the other half zipper 850 faces toward the opposing edge of the width of tow strap 810 with the teeth 829 of the zipper facing toward the edge on both sides. Optionally, the half zippers 850 are coupled to the tow strap 810 so that they do not extend beyond the width of tow strap 810. Thus one side of the tow strap completely hides the half zippers. When using the tow strap 810 to tow objects a clean side 815 without the zipper halves 850 can be placed against rocks, pulleys or other elements to prevent damage to the zipper from being rubbed against various elements. Optionally, when zipping up tow strap 810 bag 800 is formed with the clean side 815 of tow strap 810 on the external side of the bag hiding the zipper.

In an exemplary embodiment of the disclosure, a slider 823 with a pull tab 826 is used to zip up the two half zippers 850 causing the elongated tow strap 810 to form a helix shape serving as a wall for tow strap bag 800. Optionally, the two half zippers coupled to tow strap 810 are shorter than the length of tow strap 810 leaving a portion of tow strap 810 at each end without half zipper 850 coupled to it. A top end 820 is left at the top of tow strap bag 800 and a bottom end 830 is left at the bottom of tow strap bag 800. In an exemplary embodiment of the disclosure, top end 820 and bottom end 830 may be the same size or one end might be longer than the other. Optionally, the length of the ends is 10% to 20% of the length of tow strap 810 or shorter or longer, for example a tow strap 5 meters long may have ends about half a meter long. Optionally, at one end or both ends (820, 830) tow strap 810 is folded over and stitched to form a reinforcement area 826, 836 and a loop, which can be used to hold a hook or to suspend the tow strap from a bar. In some embodiments of the disclosure the ends (820, 830) are half twisted when folded over to form a half twisted loop (824, 834) to make it easier to pull the end (820, 830), more rigid or to make it easier to attach to a car hook. Optionally, in addition to the half twist or instead of it the loop on each end is reinforced with an extra piece of material (822, 832 respectively) coupled to it to protect the tow strap at the position of the loop and/or preserve the rigidity and shape of the loop.

In an exemplary embodiment of the disclosure, tow strap 810 is zipped up as a helix forming a pipe like bag without a top or bottom. Optionally, a bottom flap 860 is provided to seal off the bottom of tow strap bag $00 and/or a top flap 840 is provided to seal off the top of tow strap bag 800. In an exemplary embodiment of the disclosure, bottom flap 860 and top flap 840 can be formed from a different material than tow strap 810, fbr example from the material used to hold the teeth 829 of the half zippers. Optionally, near bottom end 830 and top end 820 the two half zippers cease to be coupled to tow strap 810, for example leaving half a percentage of the tow strap, a meter, half a meter or more or less to allow using the end as a tow strap without the zipper interfering. In an exemplary embodiment of the disclosure, at the bottom end 830, one of the half zippers continues to surround the circumference of bottom flap 860 and the second half zipper meets it after surrounding the circumference and is connected to form the starling position of the zipper. Optionally, at the top end 820 one of the half zippers 850 surrounds the circumference of top flap 840 and the other half zipper 850 ceases, without being connected to top flap 840. In some embodiments of the disclosure both top flap 840 and bottom flap 860 are essentially the same size and shape to form a symmetrically shaped bag, for example both being a rectangle, a circle or an oval. Alternatively, top flap 840 and bottom flap 860 may differ in size and/or shape from each other.

In an exemplary embodiment of the disclosure, top end 820 and/or bottom end 830 are not used to form tow strap bag 800 and can be folded inside the bag when tow strap 810 is zipped up to form tow strap bag 800. Optionally, top end 820 and or bottom end 830 can be left outside tow strap bag 800 to pull the bag or carry it.

In an exemplary embodiment of the disclosure, carrying strap connectors 870 are attached to one or more positions on tow strap 810 for connecting a carrying strap 875 to aid in carrying tow strap bag 800. Optionally, the positions for attaching the carrying strap connectors 870 are calculated so that the carrying strap 875 will be connected between opposite sides of tow strap bag 800 when zipping up tow strap 810.

It should be appreciated that the above described methods and apparatus may be varied in many ways, including omitting or adding steps, changing the order of steps and the type of devices used. It should be appreciated that different features may be combined in different ways. In particular, not all the features shown above in a particular embodiment are necessary in every embodiment of the disclosure. Further combinations of the above features are also considered to be within the scope of some embodiments of the disclosure.

It will be appreciated by persons skilled in the art that the present disclosure is not limited to what has been particularly shown and described hereinabove. Rather the scope of the present disclosure is defined only by the claims, which follow.

I claim:

1. A tow strap bag, comprising:
   an elongated tow strap for towing objects with a top end portion and a bottom end portion that are integral parts of the tow strap; wherein the elongated tow strap has two sides, an elongated axis and a short width perpendicular to the elongated axis;
   two half zippers each having an elongated row of teeth coupled to the tow strap in parallel on a single side of the two sides along the elongated axis of the tow strap with the teeth of each half zipper located near an edge of the width of the single side of the tow strap and facing opposite edges; wherein the two half zippers are coupled to the entire tow strap length except leaving the opposite edges of the width of the top end portion and the bottom end portion of the tow strap without the half zippers coupled thereon; and
   wherein the tow strap is configured to form to bag when zipping up the two half zippers.

2. A tow strap bag according to claim 1, further comprising a bottom flap to serve as a bottom of the tow strap bag, said bottom flap is attached to both half zippers near the bottom end of the tow strap.

3. A tow strap bag according to claim 2, wherein one of the half zippers extends around a circumference of the bottom flap.

4. A tow strap bag according to claim 3, wherein the tow strap bag is configured so that when zipping up the tow strap bag the bottom flap is attached by a zipper formed from the two half zippers to the elongated tow strap before attaching different areas of the elongated tow strap to each other.

5. A tow strap bag according to claim 1, further comprising a top flap to serve as a top of the tow strap bag, said top flap is attached to one of the half zippers next to the top of the tow strap.

6. A tow strap bag according to claim 5, wherein the half zipper attached to the top flap surrounds a circumference of the top flap.

7. A tow strap bag according to claim 6, wherein the tow strap bag is configured so that when zipping up the tow strap bag the top flap is the last to be attached.

8. A tow strap bag according to claim 1, wherein when zipping up the tow strap bag the side without the half zippers attached serves as an exterior side of the tow strap bag with the half zipper hidden from view.

9. A tow strap bag according to claim 1, wherein the top end portion of the tow strap is folded over and attached to itself forming a loop.

10. A tow strap bag according to claim 1, wherein the top end portion of the tow strap is folded over with a half twist and attached to itself forming a twisted loop.

11. A tow strap bag according to claim 1, wherein the bottom end portion of the tow strap is folded over and attached to itself forming a loop.

12. A tow strap bag according to claim 1, wherein the bottom end portion of the tow strap is folded over with a half twist and attached to itself forming, a twisted loop.

13. A tow strap bag according to claim 1, wherein the short width is uniform along the elongated axis of the tow strap.

14. A method of converting into a tow strap bag an elongated tow strap for towing objects with a top end portion and a bottom end portion that are integral parts of the tow strap, comprising:
   providing the elongated tow strap: wherein the elongated tow strap has two sides, an elongated axis and a short width perpendicular to the elongated axis;
   coupling two half zippers each having an elongated row of teeth in parallel on a single side of the two sides along the elongated axis of the tow strap with the teeth of each half zipper located near an edge of the width of the single side of the tow strap and facing opposite edges; wherein the two half zippers are coupled to the entire tow strap length except leaving the opposite edges of the width of the top end portion and the bottom end portion of the tow strap without the half zippers coupled thereon; and
   wherein the tow strap is configured to form a hag when zipping up the two half zippers.

15. A method according to claim 14, further comprising attaching a bottom flap to serve as a bottom of the tow strap bag, wherein said bottom flap is attached to both half zippers near the bottom end of the tow strap.

16. A method according to claim 15, wherein one of the half zippers extends around a circumference of the bottom flap.

17. A method according to claim 16, wherein the tow strap bag is configured so that when zipping up the tow strap bag the bottom flap is attached by a zipper formed from the two half zippers to the elongated tow strap before attaching different areas of the elongated tow strap to each other.

18. A method according to claim 14, further comprising attaching a top flap to serve as a top of the tow strap bag, wherein said top flap is attached to one of the half zippers next to the top of the tow strap.

19. A method according to claim 18, wherein the half zipper attached to the top flap surrounds a circumference of the top flap.

20. A method according to claim 19. wherein the tow strap bag is configured so that when zipping up the tow strap bag the top flap is the last to be attached.

* * * * *